D. W. CLARK.
Coupling.

No. 221,908. Patented Nov. 25, 1879.

Witnesses
Chas. Williams
P. M. Banfield

Inventor
D. W. Clark

UNITED STATES PATENT OFFICE.

DAVID W. CLARK, OF TIDIOUTE, PENNSYLVANIA.

IMPROVEMENT IN COUPLINGS.

Specification forming part of Letters Patent No. 221,908, dated November 25, 1879; application filed October 2, 1879.

*To all whom it may concern:*

Be it known that I, DAVID W. CLARK, of Tidioute, in the county of Warren and State of Pennsylvania, have invented a new and Improved Coupling, of which the following is a specification, reference being had to the accompanying drawings, in which—

Figure 1:
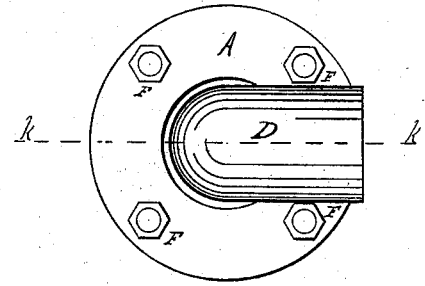
Figure 2:
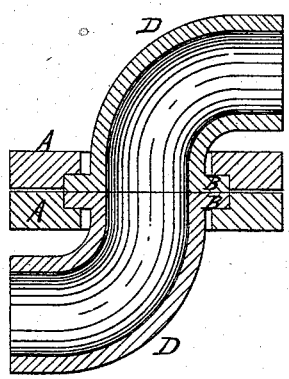
Figure 3:
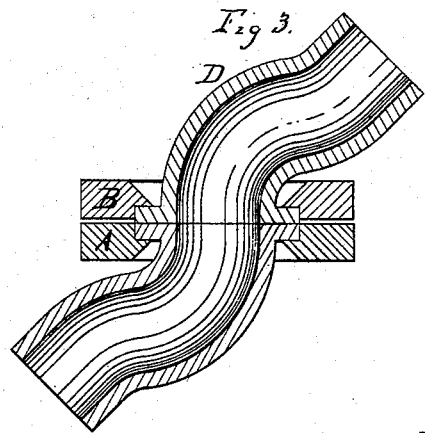

Figure 1 is a plan of a coupling constructed according to my improvement. Fig. 2 is a sectional elevation of the same on line *k k*, Fig. 1; and Fig. 3 represents a modification.

Similar letters of reference indicate corresponding parts.

The object of this invention is to provide a coupling that shall connect sections of pipe at any angle desired.

The invention consists in the combination of two flanged elbows, connected by two plates screwed together by bolts, and the whole so constructed and arranged that both the elbows are cast from one pattern and both the plates from another, whereby expense in making patterns is saved, the parts are interchangeable, and the plates may be made of cheaper material than can be used for the elbows, thereby economizing in the manufacture.

In the drawings, A A represent circular plates with a recess on the inner edge of each, and D D flanged elbows made to run at right angles to the plates A A.

The flanges B B on said elbows fit into and turn in the recesses of said plates, and are held firmly together by suitable bolts and nuts, as shown at F F.

The coupling serves as an elbow for pipe and for uniting sections in any desired position.

A screw-thread may be cut on the inside or outside the elbow, or they may be made without it, as circumstances require.

Fig. 3 is substantially the same as Fig. 2, excepting that the elbows D D are made to stand at an angle of forty-five degrees, and for some situations and purposes are better than the other form.

If preferred, screws may be used in lieu of bolts and nuts; but in such case the plates would not be interchangeable in case of breakage without reaming or threading the screw-holes.

I am aware that various styles of couplings designed to accomplish the same purpose as mine have been proposed, and that recessed plates have been used in couplings for straight pipes; but these differ essentially from mine, and none of them show recessed interchangeable plates.

What I claim as new is—

The combination of the recessed interchangeable plates A A with the flanged elbows D D, constructed and arranged substantially as and for the purposes specified.

D. W. CLARK.

Witnesses:
R. H. MORRISON,
W. R. DAWSON.